3,258,460
SULFOHYDROXAMIC ACID COMPOUNDS
Moses Wolf Goldberg, Upper Montclair, N.J., Marcel Muller, Reinach, Basel-Land, Switzerland, and Hanns Hanina Lehr, Montclair, N.J., assignors to Hoffmann-La Roche Inc., Nutley, N.J., a corporation of New Jersey
No Drawing. Filed Oct. 3, 1962, Ser. No. 227,991
3 Claims. (Cl. 260—243)

This application relates to novel therapeutically valuable compounds and novel intermediates useful in their preparation. The novel therapeutically valuable compounds of this invention are selected from the group consisting of compounds of the formula:

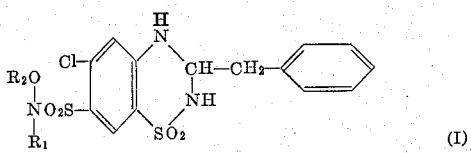

and salts thereof, wherein $R_1$ is selected from the group consisting of hydrogen and lower alkyl, and $R_2$ is selected from the group consisting of lower alkyl and carboxy-lower alkyl. In the above formula, the symbols $R_1$ and $R_2$ represent various groups which are or contain hydrocarbon radicals. These hydrocarbon radicals can be straight or branched chain groups. For example, lower alkyl comprehends both straight and branched chain saturated hydrocarbon groups such as methyl, ethyl, propyl, isopropyl, and the like. The lower alkyl radicals occurring in the carboxy-lower alkyl groups are radicals of the same character.

Compounds of Formula I and the pharmaceutically acceptable salts thereof are useful therapeutic agents and are particularly useful as diuretic and/or natriuretic agents. Said compounds or the non-toxic salts thereof can be administered in conventional pharmaceutical dosage forms, with dosage adjusted for individual requirements. They can be administered internally, for example, orally or parenterally, and can be administered in conventional pharmaceutical administration forms, for example, in solid forms such as tablets, capsules or the like, or in liquid forms such as suspensions, emulsions, solutions or the like. Said administration forms can contain conventional pharmaceutical excipients or adjuvants.

The compounds of Formula I can be prepared by a condensation of phenylacetaldehyde with a compound of the formula:

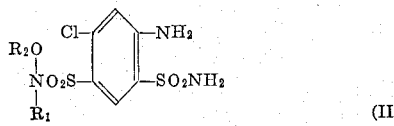

wherein $R_1$ is selected from the group consisting of hydrogen and lower alkyl, and $R_2$ is selected from the group consisting of lower alkyl and carboxy-lower alkyl.

The condensation can be effected in an inert organic solvent such as a lower alkanol, for example, ethanol or an ether, for example, bis(2-methoxyethyl)ether, or the like. Reaction is suitably effected in the presence of a catalyst such as an acid or a base, for example, an alkali metal hydroxide. It can be effected at room temperature or at an elevated temperature, but it has been found that the reaction rate is increased by an elevated temperature.

The intermediates of Formula II are novel compounds and form a part of this invention. They can be prepared from corresponding 6-chloro-2H-1,2,4-benzothiadiazine-7-hydroxamic acid 1,1-dioxides by treatment thereof with alkali. Suitably, the ring opening can be effected by an aqueous solution of an alkali hydroxide, for example, via treatment of the benzothiadiazine with aqueous sodium hydroxide. This hydrolysis treatment is suitably effected at an elevated temperature.

The compounds of Formula I above form non-toxic salts with basic agents such as alkalis, e.g. alkali metal hydroxides such as sodium hydroxide, and other non-toxic bases, e.g. organic bases such as diethanolamine. These pharmaceutically acceptable salts can be obtained by dissolving a compound of Formula I in an aqueous solution of the base. The salts are soluble in water, and such solutions can be used for internal administration.

The following examples are illustrative but not limitative of the invention. All temperatures are stated in degree centigrade.

*Example 1*

20 g. of 6-chloro-0-methyl-2H-1,2,4-benzothiadiazine-7-sulfohydroxamic acid 1,1-dioxide was dissolved in 600 cc. of 0.5 N aqueous sodium hydroxide. The resulting solution was heated at 100° for 1 hour, and poured into ice-water. The precipitate was filtered off and recrystallized from acetone-water yielding 2-chloro-4-amino-5-sulfamoyl-0-methylbenzenesulfohydroxamic acid melting at 192–193°.

13 g. of 2-chloro-4-amino-5-sulfamoyl-0-methylbenzenesulfohydroxamic acid and 5 g. of phenylacetaldehyde were dissolved in 150 cc. of ethanol. 0.8 cc. of 40% aqueous sodium hydroxide was added, and the mixture refluxed for 1 hour. The solution was then cooled and added, with stirring and ice-cooling, to 500 cc. of 10% aqueous hydrochloric acid. The resultant white precipitate was filtered off, dried in vacuo, and treated with ether. The ether-insoluble product was filtered off and recrystallized from ethanol-water, yielding 3-benzyl-6-chloro-0-methyl-3,4-dihydro-2H-1,2,4 - benzothiadiazine-7-sulfohydroxamic acid 1,1-dioxide melting at 217–218°.

The above mentioned 6-chloro-0-methyl-2H-1,2,4-benzothiadiazine-7-sulfohydroxamic acid 1,1-dioxide is not a part of this invention, but its preparation is disclosed hereinbelow in order that the present disclosure may be complete.

100 g. of 6-chloro-2H-1,2,4-benzothiadiazine-7-sulfonamide 1,1-dioxide was added to 900 cc. of chlorosulfonic acid, and the mixture was heated to 130° for 5 hours. The cooled solution was poured on ice, the white precipitate filtered off, washed thoroughly with water, and dried in vacuo at 60°. After recrystallization from acetone-water, the so-obtained 6-chloro-2H-1,2,4-benzothiadiazine-7-sulfonyl chloride 1,1-dioxide melted at 257–258° (dec.).

To a solution of 14.8 g. of methoxyamine hydrochloride in 250 cc. of pyridine, there was added in portions 22 g. of 6-chloro-2H-1,2,4-benzothiadiazine-7-sufonyl chloride 1,1-dioxide, and the mixture was stirred overnight at room temperature. The resulting solution was then slowly added to 750 cc. of 10% hydrochloric acid with cooling. After permitting the reaction mixture to stand for 2 hours in an ice-bath, the crystalline precipitate was filtered off, washed with water and air-dried. After recrystallization from ethanol-water, the so-obtained 6-chloro-0-methyl-2H-1,2,4-benzothiadiazine - 7 - sulfohydroxamic acid 1,1-dioxide melted at 244–245° (dec.).

*Example 2*

20 g. of 6-chloro-0-carboxymethyl-2H-1,2,4-benzothiadiazine-7-sulfohydroxamic acid 1,1-dioxide was dissolved in 200 cc. of 1N aqueous sodium hydroxide. The solution was refluxed for 2 hours, and poured into 200 cc. of 10% aqueous hydrochloric acid with stirring and ice-cooling. The precipitate was filtered off and recrystallized from acetone-water, yielding 2-chloro-4-amino-5-sulfamoyl-0-(carboxymethyl)-benzenesulfohydroxamic acid melting at 220–221° (dec.).

10.8 g. of 2-chloro-4-amino-5-sulfamoyl-0-(carboxymethyl)-benzenesulfohydroxamic acid was dissolved in 120 cc. of hot ethanol. 15 cc. of water and 3 cc. of aqueous 40% sodium hydroxide were then added, followed by 3.6 g. of phenylacetaldehyde dissolved in 50 cc. of ethanol. The mixture was refluxed for 1 hour, cooled and poured into 300 cc. of 10% aqueous hydrochloric acid. The gummy precipitate was filtered off, dissolved in 150 cc. of 2% aqueous sodium hydroxide, and the solution acidified. The precipitate was filtered off and dissolved in acetone. The acetone solution was filtered from insolubles and evaporated to dryness in vacuo. The residue was dissolved in 60 cc. of 5% sodium bicarbonate solution, and the solution acidified. The precipitate was filtered off, washed thoroughly with water and dried in vacuo. It was again dissolved in 60 cc. of 5% sodium bicarbonate solution, and the solution acidified. The precipitate was filtered off, washed with water, and dried in vacuo, yielding 3-benzyl-6-chloro-0-carboxymethyl-3,4-dihydro - 2H-1,2,4-benzothiadiazine-7-sulfohydroxamic acid 1,1-dioxide as a light-yellow amorphous powder, which melted at 135–145° with frothing.

The above mentioned 6-chloro-0-carboxymethyl-2H-1,2,4-benzothiadiazine-7-sulfohydroxamic acid 1,1-dioxide is not a part of this invention, but its preparation is disclosed hereinbelow in order that the present disclosure may be complete.

20 g. of 6-chloro-7-chlorosulfonyl-2H-1,2,4-benzothiadiazine 1,1-dioxide and 9.4 g. of aminoxyacetic acid hemihydrochloride were suspended in 100 cc. of pyridine and the mixture stirred overnight at room temperature. The clear solution was evaporated to dryness. The residue was dissolved in 200 cc. of 10% aqueous hydrochloric acid and the solution stirred for 3 to 4 hours. A heavy precipitate was formed which was filtered off, washed with water and dried in vacuo. After recrystallization from acetone-water, the product, 6-chloro-0-carboxymethyl-2H-1,2,4-benzothiadiazine-7-sulfohydroxamic acid 1,1-dioxide, melted at 245–246° C. (dec.).

We claim:
1. A compound selected from the group consisting of compounds of the formula:

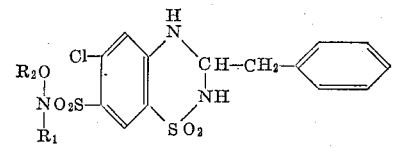

and salts thereof, wherein $R_1$ is selected from the group consisting of hydrogen and lower alkyl, and $R_2$ is selected from the group consisting of lower alkyl and carboxy-lower alkyl.

2. 3-benzyl-6-chloro-0-lower alkyl-3,4-dihydro-2H-1,2,4-benzothiadiazine-7-sulfohydroxamic acid 1,1-dioxide.

3. 3-benzyl-6-chloro-0-methyl-3,4-dihydro-2H - 1,2,4-benzothiadiazine-7-sulfohydroxamic acid 1,1-dioxide.

References Cited by the Examiner
UNITED STATES PATENTS

| | | | |
|---|---|---|---|
| 2,809,194 | 10/1957 | Novello | 260—243 |
| 2,910,474 | 10/1959 | Novello | 260—243 |
| 2,965,656 | 12/1960 | Novello | 260—397.7 |
| 2,970,154 | 1/1961 | Werner et al. | 260—397.7 |
| 3,060,178 | 10/1962 | Ziegler | 260—243 |

FOREIGN PATENTS

| | | |
|---|---|---|
| 36,956 | 5/1959 | Luxembourg. |

NICHOLAS S. RIZZO, *Primary Examiner.*